United States Patent [19]

Gladding et al.

[11] Patent Number: 4,688,711

[45] Date of Patent: * Aug. 25, 1987

[54] DRIVER FOR RIVETING FASTENERS TO A BELT

[75] Inventors: Alfred E. Gladding, Naperville; Edward C. Musil, Lyons, both of Ill.

[73] Assignee: Flexible Steel Lacing Company, Downers Grove, Ill.

[*] Notice: The portion of the term of this patent subsequent to Nov. 4, 2003 has been disclaimed.

[21] Appl. No.: 774,099

[22] Filed: Sep. 9, 1985

Related U.S. Application Data

[63] Continuation-in-part of Ser. No. 730,370, May 3, 1985, Pat. No. 4,620,657, which is a continuation-in-part of Ser. No. 710,103, Mar. 11, 1985, which is a continuation of Ser. No. 489,379, Apr. 28, 1983, abandoned.

[51] Int. Cl.$^4$ .............................. B25C 9/00; B25D 1/00
[52] U.S. Cl. .................................. 227/147; 227/156; 29/243.51
[58] Field of Search ............... 227/30, 55, 60, 130, 227/131, 147, 156; 29/243.51

[56] References Cited

U.S. PATENT DOCUMENTS

| 992,547 | 5/1911 | Crandall | 227/147 |
|---|---|---|---|
| 1,222,129 | 4/1917 | Polkowski | 227/147 |
| 1,237,360 | 8/1917 | Martin | 227/147 |
| 1,568,308 | 1/1926 | Albee | 227/147 |
| 3,008,361 | 11/1961 | Henning | 227/147 |
| 3,141,346 | 7/1964 | Dean | 74/231 |
| 3,176,358 | 4/1965 | Leflon | 24/33 |
| 3,278,104 | 10/1966 | Becht et al. | 227/130 |
| 3,581,350 | 6/1971 | McComb | 227/120 X |
| 3,742,557 | 7/1973 | Francois | 24/33 B |
| 3,913,180 | 10/1975 | Pray | 24/31 B |
| 4,030,655 | 6/1977 | Rothfuss et al. | 227/130 |
| 4,111,080 | 9/1978 | Pray | 29/243.51 |
| 4,620,657 | 11/1986 | Gladding et al. | 227/147 |

*Primary Examiner*—Mark Rosenbaum
*Assistant Examiner*—Taylor J. Ross
*Attorney, Agent, or Firm*—Fitch, Even, Tabin & Flannery

[57] ABSTRACT

A novel apparatus is provided for riveting belt fasteners to belts wherein a plurality of rivet assemblies are driven simultaneously while aligned and guided by elongated bores of a guide block assembly. An impact distributing driver is employed to transmit impact force from a single hammer simultaneously to a plurality of rivet assemblies held in a guide block above a belt fastener. In the preferred embodiment, all of the rivet assemblies for a particular belt fastener may be driven simultaneously. The preferred driver comprises a metal cap with a plurality of elongated metal drive rods extending downwardly therefrom to be received within the bores of the guide block assembly. The drive rods are cushioned against fracturing at their upper connections to the cap by an elastomeric cushioning material, which is preferably a polymeric plug secured in a recess in the cap. Preferably, the drive rods have upper ends force fitted into bores in the metal cap with the plug surrounding all of the drive rods and allowing the upper ends of the drive rods to flex without fracturing when non-coaxial loads are applied to the driver. The plug is precast and is force-fitted into the recess and into tight engagement with the upper ends of the drive rods.

6 Claims, 5 Drawing Figures

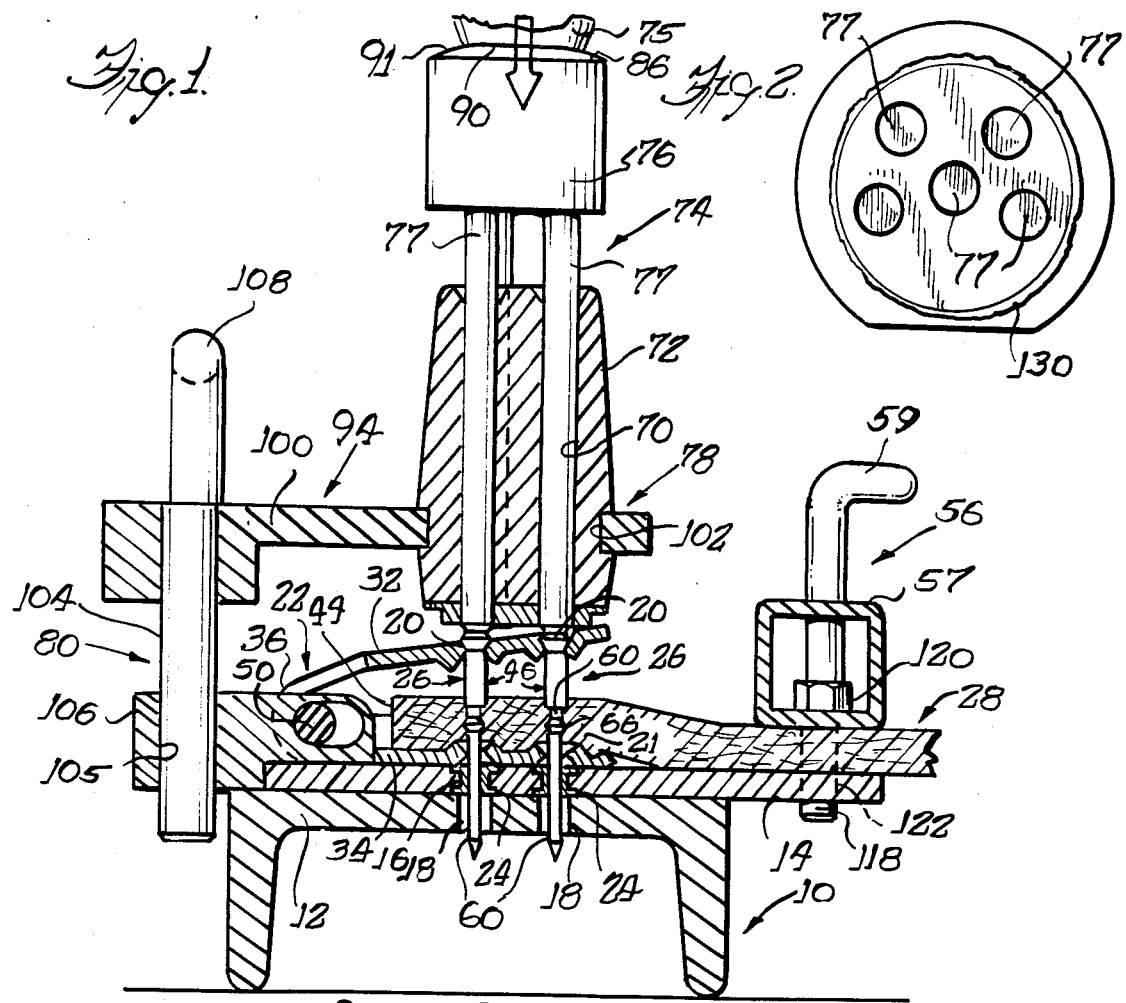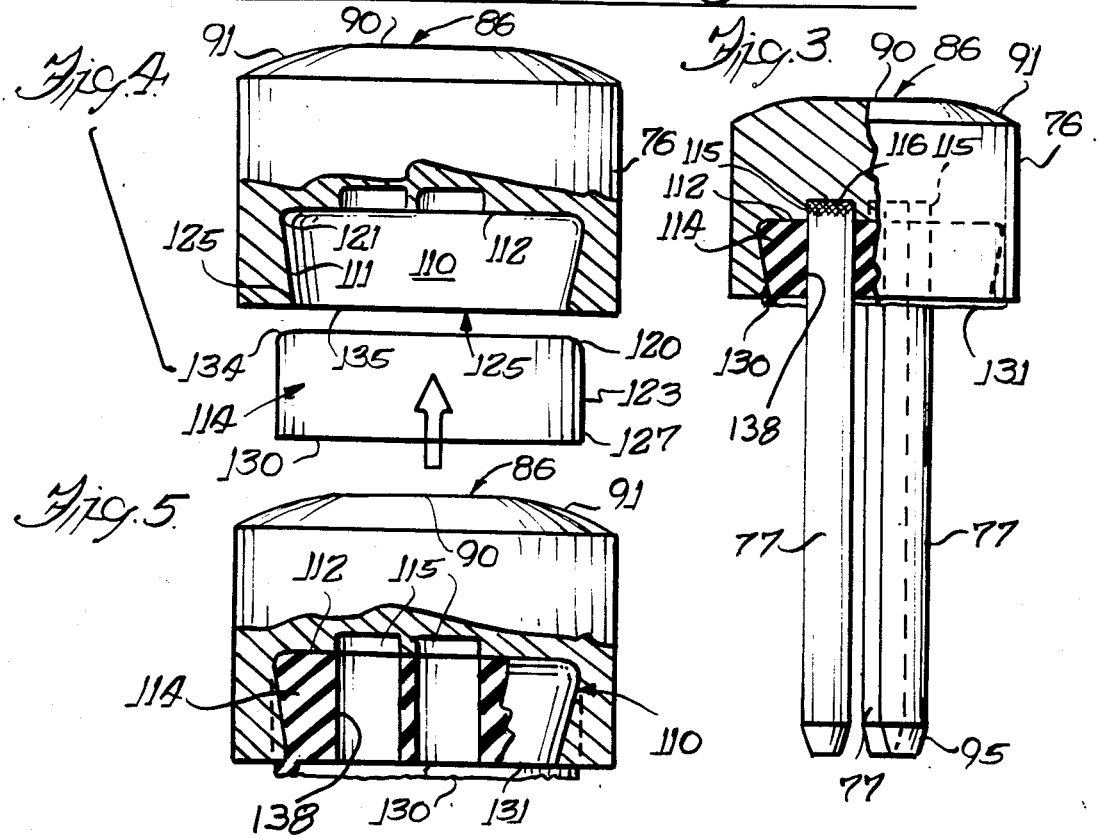

DRIVER FOR RIVETING FASTENERS TO A BELT

BACKGROUND OF THE INVENTION

This application is a continuation-in-part of U.S. Ser. No. 730,370 filed May 3, 1985, now U.S. Pat. No. 4,620,657, which, in turn, is a continuation-in-part of U.S. Ser. No. 710,103, filed Mar. 11, 1985, which is a continuation of U.S. Ser. No. 489,379, filed Apr. 28, 1983, now abandoned.

The present invention is directed to a driver used with an apparatus which is used to install belt fasteners on conveyor belts. Two types of fasteners commonly used to join conveyor belt ends are "plate" belt fasteners, examples of which are shown in U.S. Pat. No. 3,141,346, and "hinge" belt fasteners, examples of which are shown in U.S. Pat. Nos. 3,742,557 and 3,176,358. Plate fasteners form a generally rigid, inflexible connection between adjacent belt ends. Hinge fasteners form a pivotal connection. Both types of belt fasteners are generally made of metal and include upper and lower plates and are secured to a belt end by placing the belt end between the upper and lower plates and riveting the plates to the belt.

Although the present invention is not limited to any particular belt fastener, the present invention hereafter will be described in connection with one particular form of fastener to secure the belt fastener plates to the belt. The fasteners used may be other forms such as, for example, staples rather than the preferred and illustrated nail and rivet assemblies. Installation of a rivet generally involves driving a rivet assembly downward through a perforation in an upper fastener plate, through the belt, and through a perforation in a lower fastener plate, and then deforming the lower end of the rivet to secure it in place. The belt material is compressed somewhat as the rivets are installed. The preferred rivet assembly typically includes a nail which is pointed at its lower end for piercing the belt and a rivet having a hollow lower end which is adapted to be flared outwardly by a shoulder on the nail, as described in U.S. Pat. No. 3,913,180. Deforming the lower end of the rivet while simultaneously compressing the belt material requires a relatively great amount of force, as does piercing the belt material with the nails. Proper installation of the rivets generally involves striking the rivet assembly with either a pneumatic or a conventional hammer while the rivet assembly is aligned with the perforations in the fastener plates and maintained substantially perpendicular to the belt. Typically, the hammer is large, e.g., a four pound hammer, and it is swung with a great deal of velocity to impact hard the rivet assembly to drive the nail through the belt.

Conveyor belts of the type described herein are commonly used in applications where it is desirable that repair of belts be accomplished quickly. For example, such belts are used in mines where time spent in repair of belts represents costly down time for mining operations. For this reason, there has been developed, as disclosed in the aforementioned patent applications, a guide block which holds a set of fasteners for being driven by a multi-prong driver which simultaneously drives each of the fasteners into and through the belt and through the openings in the belt fastener plates.

More specifically, the hinged belt fasteners disclosed in the aforementioned patent applications included five rivet-nail assemblies each of which was driven simultaneously through the conveyor belt by the multi-prong driver. The multi-prong driver had a block-shaped head or cap of steel and five elongated pins or rods which are driven against the upper ends of the rivets. The thickness and the spacing of the five rods is dictated by the closeness of the five fastener assemblies to each other on the fastener plates. Typically, a four pound hammer was swung with considerable force and velocity against the head of the driver and the impact was distributed over the five elongated driving rods. Despite various efforts to use extremely strong or tough steels and/or alloys, one or more of the driving rods was found to break after repetitive use of the driver block below the several thousand fastener driving operations desired as a minimum life for the driver. Various heat treating and other metal strengthening ideas were tried but did not perform adequately. Thus, there is a need for a new and improved driver for use in apparatus of the foregoing kind.

SUMMARY OF THE INVENTION

In accordance with the present invention, a plurality of rivet assemblies for securing belt fasteners to belt ends are disposed within elongated bores in a guide block prior to installation and may be driven simultaneously by a hammer in combination with an impact distributing driver. The driver transmits impact force from a single hammer simultaneously to a group of rivet assemblies. The driver herein comprises a cap with a plurality of elongated drive rods extending downwardly therefrom to be received within the bores of the guide block so that the lower ends of the drive rods contact the upper ends of the rivets. In the illustrated embodiment, the drive rods are embedded in a polymer plug secured in a recess in the cap, with the number of drive rods preferably being equal to the number of rivets for a single belt fastener. The preferred embodiment uses a precast plug of polymer larger in size than a recess in the driver cap and the plug is force fitted into the recess and the drive rods are force fitted into holes in the plug.

Accordingly, it is a general object of the present invention to provide an improved driver for driving a plurality of fasteners simultaneously to secure a belt fastener to a belt.

It is another object of the present invention to provide a stronger driver for forcing rivet assemblies through belt ends.

Further objects and advantages will become apparent from the following description and the acompanying drawings.

BRIEF DESCRIPTION OF THE DRAWINGS

FIG. 1 is an elevational sectional view of an apparatus embodying the present invention;

FIG. 2 is a bottom view of the improved driver cap assembly of the present invention;

FIG. 3 is an elevational view in partial cross section showing the improved driver cap;

FIG. 4 is an exploded view showing the plug prior to being force fitted into an undercut recess in the cap body; and FIG. 5 is an elevational view in partial cross section of the driver cap prior to the installation of the drive rods.

DETAILED DESCRIPTION OF THE PREFERRED EMBODIMENT

The present invention is generally embodied in an apparatus for securing rows of perforated belt fasteners by rivets to belt ends. While the embodiment of the invention hereinafter described and illustrated in the drawings is for securing hinge fasteners to belt ends, it will be understood that the present invention may also be embodied in an apparatus for securing plate fasteners to belt ends and that the fasteners used may be staples or other kinds of fasteners rather than the illustrated nail and rivet assemblies.

Referring to FIG. 1, the apparatus herein generally includes a base 10 made from a length of steel channel and having a generally horizontal portion 12 which supports a plurality of anvil plates 14. The width of the belt 28 determines the minimum length of the base 10. Belts typically have widths of, for example, 24, 42, or 60 inches.

Apertures 16 and 18, corresponding to countersunk holes or perforations 20 and 21 in the belt fasteners 22, are formed through the anvil plate 14 and the underlying horizontal portion 12 of the base respectively. Each of the apertures 16 in the anvil plates is substantially centered in a button 24 which comprises a generally circular, upwardly extending rim. As described in greater detail below, each of the apertures and buttons cooperates with one of the rivet assemblies 26 as the rivet assemblies are driven downward.

Each of the hinge-type fasteners 22 includes an upper plate 32 and a lower plate 34 which are joined by a flexible, generally U-shaped center hinge portions 36 adapted to interfit with opposite U-shaped portion of belt fasteners on an adjacent belt end (not shown) to form a hinge structure to receive a hinge pin (not shown). The countersunk holes or perforations 20, 21 for receiving rivets are formed in a predetermined pattern through each fastener plate 32, 34, the upper fastener plates 32 being countersunk on their top surfaces and the lower fastener plates being countersunk on their bottom surfaces. The preferred fastener plates each have five perforations arranged in a W-shaped pattern. The fastener-receiving perforations are located about one-half inch from an adjacent perforation.

Prior to installation, the upper plates 32 are upwardly inclined from the U-shaped portions 36 to facilitate insertion of the belt end 44 between the upper and lower plates. Installation of the rivets 46 (FIG. 1) pushes the upper plates 32 downward, flexing the U-shaped portions 36 so that the belt end 44 is squeezed between the upper and lower plates.

The fasteners 22 are maintained in a predetermined position by engagement of the countersunk portions of the lower fastener plates 34 with the upwardly facing buttons 24 on the anvil plates 14, and are locked into place by a gauge pin 50 which extends through the U-shaped portions 36 of the belt fasteners 22.

The belt 28 is maintained in position by clamping means 56 which herein comprises a generally horizontal clamping member 57 with screws 59 at each end for applying downward pressure to the clamping member. The preferred clamping member 57 is a length of square tubing. Each screw 59 comprises a generally L-shaped rod having a threaded portion 118 at its lower end and a nut 120 fixed to it above the threaded portion. The threaded portions 118 of the screws are received in threaded bores 122 in the anvil plates 14 at the corners of the base. Clockwise rotation of the screws 59 forces the nuts 120 downward against the bottom of the tube to clamp the belt in place.

To rivet a row of fasteners 22 to the belt 28, the belt end 44 is inserted between the upper and lower fastener plates 32 and 34, and rivet assemblies 26 are driven downwardly through the perforations 20 in the upper fastener plate, through the thickness of the belt end 44, and through the perforations 21 in the lower fastener plate.

Referring to FIG. 1, each of the illustrated rivet assemblies 26 includes a rivet 46 having a head at its upper end and a hollow lower end for receiving the upper end of an interfitting detachable nail 60. The nail has a sharpened point at its lower end for piercing the belt material and guiding the rivet assembly through the perforations 20, 21 in the fasteners and apertures in the anvil plates 14, an integral upwardly extending pin at its upper end which fits within the hollow lower end of the rivet 46, and an integral annular shoulder 66 formed just below the pin 64.

As a rivet assembly 26 is driven downward, the shoulder 66 seats in the button 24, arresting the downward progress of the nail 60. As the lower end of the rivet 46 passes through the perforation 21 in the lower fastener plate 34, the upper surface of the button 24 flares the hollow lower end outwardly as described in U.S. Pat. No. 4,258,461. As described in greater detail below, the rivet assemblies 26 are aligned and guided as they are driven by a plurality of substantially vertical bores 70 in a guide means 78.

An impact distributing driver 74 is employed to transmit impact force from a single hammer 75 simultaneously to a plurality of rivet assemblies disposed within the bores 70 of the guide means 78. A guide block 72, preferably made of an elastomer, is part of the guide means or block assembly 78 supported in a rigid frame 94 and preferably includes alignment means 80 for maintaining the guide block in one of a plurality of predetermined positions with respect to the base 10. The guide block is preferably constructed as described in copending application Ser. No. 710,103, which is hereby incorporated by reference as if fully reproduced herein. The preferred driver 74 includes an impact upper end or cap 76 for receiving hammer blows and a plurality of downwardly extending drive pins or rods 77 which are fixed at their upper ends to the cap and adapted to be received within the bores 70 of the guide block 72. The drive rods are preferably arranged in a group corresponding to a group of perforations 20, 21 in a single fastener plate 32, 34 so that all of the rivet assemblies 26 for a particular fastener 22 may be driven simultaneously.

The cap 76 is preferably metallic and has a generally crowned top surface 86 for receiving hammer blows. That is, the cap 76 has a slightly domed top surface with a small central flat portion 90, at the central axis location with the surrounding annular surface 91 being located on a downwardly curved and downwardly inclined surface such that glancing blows hitting the annular surface 91 tend to slide off this top impact surface of the drive cap whereas the centered blows striking the central flat portion 90 does not glance or slide off and delivers the full force of the blow to the drive rods. It is desirable to have the non-central blow glance off as this places less force on the drive rod closest to the non-centered blow. That is, a non-centered blow will not be allowed to concentrate most of the force one drive rod and overstress it. On the other hand, a centered blow distributes the force more evenly over all of the rods and should not overstress them individually.

In the illustrated embodiment, the drive rods 77 are arranged in a generally W-shaped group (best seen in FIG. 2) corresponding to a standard arrangement of perforations in hinge fasteners. The drive rods 77 herein are generally cylindrical, their lower ends 95 being chamfered to facilitate their insertion into the bores 70 of the guide block 72. The cap and drive rods are preferably made of hardened steel.

The multi-prong driver disclosed in the aforementioned patent application Ser. No. 710,103 simply did not provide the desired life because one or more of its rods would permanently deform or break from the cap at the juncture of the rod to the lower surface of the cap. Numerous efforts to use different steels and alloys for the drive rods did not overcome the problem. The size of the rods is limited by the geometrical configuration of the guide block, the size of the rivet heads, and spacing of the rivet assemblies in a close W configuration. It was theorized that glancing or non-coaxial blows to the cap unduly localized stresses in the drive rods to the point where they failed. A four pound hammer swung with all one's might against the driver that is canted so as not to evenly load all of the five drive rods can and has fractured or permanently deformed one or more of the drive rods. Or, a blow that was not centered on the cap overstressed one or more of the drive rods taking the brunt of the blow. Thus, the life of the driver was not meeting the desired minimum expectancy of several thousand fasteners before failure.

Stated differently, because the blows delivered by the hammer 75 to the cap 76 will not necessarily be coaxial with the drive rods 77, significant laterally directed force components may develop at the interface of the drive rods 77 and the cap 76. After repeated use, such laterally directed and localized forces particularly at the location where the rods join the cap body can result in permanent deformation or bending of the drive rods 77 and, possibly, breakage.

In accordance with the present invention, the useful life of the impact distributing driver 74 is increased by providing a resilient or cushioning means for the drive rods 77 on the driver to reduce the localized effect of forces tending to permanently deform or break the drive rods during driving of the rivets. This is achieved by providing a cushion of elastomeric material about the drive rods 77 at their upper end connections to the cap. Preferably, the cushioning means is a common block or plug which allows the drive rods to bend or deflect at their upper ends when glancing blows are applied to the cap.

Referring more particularly to FIGS. 2-4, the driver cap 76 is machined to have a recess 110 which is undercut or back-tapered at 111 to the terminal end wall portion 112 of the recess. The drive rods 77 are then arranged within the recess so as to be alignable with the vertical bores 70 in the guide block 72. To maintain the drive rods 77 in their proper relation and to provide resilient support therefor, the recess 110 is filled with the cushioning means, designated by 114 (FIG. 3), which herein is a plug of elastomeric material, preferably a polymer, encircling each upper end of the drive rods 77. Upon the application of forces to the drive rods 77 with a high lateral component tending to flex the drive rod, the drive rods may flex by compressing a portion of the cushioning plug 114 and, after cessation of the forces, the compressed plug material may expand as the drive rod returns to its original non-flexed position. The undercut 111 in the recess 110 provides a mechanical lock for the elastomeric plug 114, thus ensuring that the plug 114 and its associated drive rods 77 will be maintained within the recess. As shown, the taper or undercut 111 is approximately 7°.

The plug illustrated in application Ser. No. 730,370 had the plug 114 formed in-situ by pouring liquid material into the recess 110 and curing and hardening the liquid polymeric material into a solid block or plug while within the recess. While the results were generally satisfactory compared to the prior results, the life of the driver was still too short, e.g. about 20,000 rivet assemblies. It appears that the polymeric plug when poured and cured, in situ, tends to shrink during its curing from liquid to a solid state and this forms internal stresses in the cast plug which tend to form cracks to relieve the stresses after usage.

It has been found that the life of the driver can be extended substantially above 20,000 rivet assemblies by precasting the plug 114 to be oversize with respect to the cavity or recess 110, which is to receive the plug, and then force fitting the plug into the recess 110 to form a plug which does not have the internal stresses therein that caused the poured plug to crack. The preferred elastomeric plug 114 is formed with an initial diameter, e.g. of 1.545 inch, which is slightly smaller than the largest diameter inner section 121 of the recess 110. But the end portion 120 will be squeezed and reshaped when pressed under high pressure into the recess to fill completely the inner recess section 121, as best seen in FIG. 5 and to abut the inclined wall 111 of the recess adjacent the recess end wall 112. The illustrated precast plug has a generally cylindrical outer wall 123, that is larger in diameter than the recess mouth or opening 125. Herein, the diameter of the recess opening 125 is 1.500 inch and the diameter of the plug cylindrical wall is 1.545. The outer end portion 127 of the plug will be compressed and reduced in size by about 0.045 while the inner end 134 of the plug is expanded in diameter to match the largest diameter portion 121 of the recess 110. The nature of the illustrated polyurethane is that it does not compress and expand but actually cold flows and reshapes itself to become larger to fill the bottom of the recess and smaller to fit in the recess opening 125. During the pressing operation, a small amount of excess plug material is often formed into a small ring 130 projecting downwardly from bottom wall 131 of the plug. To facilitate the insertion of the plug through the smaller size recess opening 125, it is preferred to provide a rounded or chamferred edge 134 on the inner portion 120 of the plug and to provide a rounded or chamferred edge 135 at the opening 125 into the recess 110. Herein, the press fit is achieved by using high pressures, for example, up to 50,000 pounds of force.

In the illustrated embodiment, the drive rods 77 are press fitted into individual bores 138 in the plug 114, after it has been press fitted into the metal cap body, as seen in FIG. 5 and the upper ends 116 are press fitted into bores 115 in the terminal end wall portion 112 of the recess 110. The drive rods 77 are press fitted into the bores 115 to maintain them in their proper position. Preferably, the ends 116 of the drive rods 77 are knurled or slightly tapered to faciliate their fitting into the bores 115. By way of example, a typical driver assembly 74 is approximately 2 inches in diameter, with the recess 110 being approximately ½ inch deep and the individual bores 115 extending ⅛ inch into the terminal end wall 112. The drive rods 77 are machined to have a diameter to press fit into the bores 138 and 115. The illustrated plug 114 is made from a polyurethane having a hardness of 75 D on the Rockwell scale. Alternatively the plug 114 may be of another elastomeric or rubberlike material. The plug is not so soft as to be compressed by manual finger pressure. It has been found that a driver cap of this configuration has a useful life of 5 to 6 times more applications than a driver cap in which the drive rods are merely press fitted into the cap.

The frame 94 which supports the block 72 comprises a metal body 100 having a generally rectangular opening 102 to accommodate the block and including alignment means 80 to provide precise positioning of the guide block relative to the base 10. The preferred alignment means 80 comprises a pair of downwardly extending rods such as 104 which are received in a close sliding fit within vertical bores 105 in collars 106 fixed to the base 10. A handle 108 extends upwardly from the body 100 to facilitate manual shifting of the guide block assembly.

Briefly summarizing the operation of the inventive apparatus, the belt fasteners 22 are positioned on the base 10, and the belt end 44 is inserted between the upper and lower fastener plates 32 and 34. Then groups of rivet assemblies 26 are successively driven downward through the fasteners and belt end. The method of use is identical to that disclosed in the co-pending application Ser. No. 710,103.

More specifically, after the belt is secured to the base 10 with the fastener plates 32, 34 and guide block assembly 78 in place, a plurality of rivet assemblies 26 are then driven simultaneously. To this end, the driver 74 is positioned above the guide block 72 and the drive rods 77 are inserted downwardly into a plurality of the vertical bores 70. Downward impact forces are applied to the upper cap surface 86 by a hammer 75 or the like to drive the rivet assemblies 26 downward until the shoulders 66 seat in the buttons 24 and the lower ends of the rivets 46 are flared outward. In the preferred embodiment of the invention, the drive rods 77 correspond in number and position to the perforations 20 in a single fastener plate 32 so that all of the rivets 46 for a particular belt fastener may be driven simultaneously.

It is clear that the driver 74 need not be held with one hand while the hammer 75 is being wielded by the other hand. Often workers hit their fingers if they must hold the driver. Also, when workers hold the driver, they usually apply lighter blows in fear of hitting themselves. But with the five drive rods 77, the driver 74 is clearly held stable, as shown in FIG. 1 by the guide block 72 and a very heavy blow from a very large and heavy hammer can be delivered for securing thousands of fastener plates without breaking the driver. The cushioning of the drive rods 77 with the cushioning means has substantially reduced the permanent deformation or breakage of drive rods along the lower surface of the cap.

From the foregoing it will be appreciated that a novel apparatus is provided for on-site installation of fasteners on belt ends. The apparatus of the present invention enables belt fasteners to be riveted to belt ends more quickly, efficiently, and safely than in the past without substantially increasing the amount of equipment required for the job. While a preferred embodiment has been shown and described herein, there is no intent to limit the invention to any particular embodiment. Rather, it is intended to cover all modifications and equivalents within the scope of the appended claims.

What is claimed is:

1. A driver for driving a plurality of fasteners through a belt and for securing a belt fastener to the belt, said driver comprising a metal cap including
   a metal block-shaped body,
   a plurality of elongated metal drive rods secured at their upper ends in the body,
   said drive rods being parallel and extending to lower ends for driving engagement with the fasteners,
   an upper impact surface on the body to receive a blow to drive the lower ends of the drive rods and to drive the fasteners through the belt, a bottom wall on said body having a recess means therein, and
   a cushioning means comprising a plug of elastomeric material force fitted into said recess means and into tight engagement with the upper ends of the drive rods and cushioning the upper ends of the drive rods against permanent deformation or breaking from the body under a non-coaxial blow to the impact surface.

2. A driver in accordance with claim 1 in which said upper impact surface on said body has a curved crown shape to allow glancing blows to slide off the head to reduce the liklihood of breaking a rod with a glancing blow to said crown shaped impact surface.

3. A driver in accordance with claim 1 including a plurality of bores in the block-shaped body, each of the upper ends of drive rods being positioned in a bore.

4. A driver in accordance with claim 3 including knurled portions on the upper ends of the drive rods for force fitting into the bores.

5. A driver in accordance with claim 1 including means to secure the plug in the recess in the cap block.

6. A driver in accordance with claim 4 in which the means to secure the plug in the recess comprises an undercut wall in the cap block recess so that an interior portion of the plug is held against straight vertical removal.

* * * * *

UNITED STATES PATENT AND TRADEMARK OFFICE
CERTIFICATE OF CORRECTION

PATENT NO.   :   4,688,711

DATED        :   August 25, 1987

INVENTOR(S)  :   Alfred E. Gladding and Edward C. Musil

It is certified that error appears in the above-identified patent and that said Letters Patent is hereby corrected as shown below:

Column 8, Line 51, change "4" to --5--.

Signed and Sealed this

Twenty-third Day of February, 1988

Attest:

DONALD J. QUIGG

*Attesting Officer*        *Commissioner of Patents and Trademarks*